United States Patent
Sakakibara

(10) Patent No.: US 7,656,130 B2
(45) Date of Patent: Feb. 2, 2010

(54) BATTERY CHARGER

(75) Inventor: Kazuyuki Sakakibara, Anjo Achi (JP)

(73) Assignee: Makita Corporation, Anjo-shi Aichi (JP)

( * ) Notice: Subject to any disclaimer, the term of this patent is extended or adjusted under 35 U.S.C. 154(b) by 248 days.

(21) Appl. No.: 11/430,189

(22) Filed: May 8, 2006

(65) Prior Publication Data
US 2006/0255771 A1    Nov. 16, 2006

(30) Foreign Application Priority Data
May 10, 2005    (JP) ............................. 2005-137720

(51) Int. Cl.
H02J 7/04    (2006.01)
(52) U.S. Cl. ...................................... 320/150
(58) Field of Classification Search .............. 320/132, 320/134, 136, 137, 150, 35, 43, DIG. 21, 320/153, 160; 324/427, 431, 433, 720, 722; 340/635, 636.1, 636.18, 636.2
See application file for complete search history.

(56) References Cited

U.S. PATENT DOCUMENTS

| | | | | |
|---|---|---|---|---|
| 3,624,481 A | * | 11/1971 | Macharg | 320/153 |
| 3,927,361 A | * | 12/1975 | Macharg | 320/149 |
| 4,609,861 A | * | 9/1986 | Inaniwa et al. | 320/152 |
| 5,180,962 A | * | 1/1993 | Giancaterino et al. | 320/153 |
| 5,523,668 A | * | 6/1996 | Feldstein | 320/118 |
| 5,627,449 A | * | 5/1997 | Fujiki | 320/106 |
| 5,686,816 A | * | 11/1997 | Hayashi et al. | 320/106 |
| 5,825,155 A | * | 10/1998 | Ito et al. | 320/118 |
| 2005/0134232 A1 | * | 6/2005 | Yamamoto | 320/150 |

OTHER PUBLICATIONS

JP laid-open publication of patent No. 2005-65429 with English Abstract, Sony Corp.; Ichikawa Tomotoshi, Oct. 3, 2005.

* cited by examiner

Primary Examiner—Edward Tso
Assistant Examiner—M'Baye Diao
(74) Attorney, Agent, or Firm—Orrick, Herrington & Sutcliffe LLP

(57) ABSTRACT

Object of the invention is to provide an improved technique of suitably charging a battery assembly irrespective of the kind of the battery assembly. The representative battery charger 100 includes a power supply section 110, a detecting section 130 that detects voltage that represents a temperature index of the battery assembly 200, 300 a reference voltage that is compared with the detected temperature-representing voltage of the battery assembly. The battery charger 100 stops supplying the charging current when the temperature-representing voltage of the battery assembly reaches or exceeds the reference voltage. The reference voltage varies according to the charging voltage of the battery assembly and thus, the threshold temperature to complete the charge can be varied according to the charging voltage of the battery assembly 200, 300. As a result, an overload state for the battery assembly with high charging voltage and high temperature can effectively be prevented.

8 Claims, 2 Drawing Sheets

BATTERY CHARGER

BACKGROUND OF THE INVENTION

1. Field of the Invention

The present invention relates to a battery charger for charging a battery assembly and more particularly, to an improved technique of suitably charging a battery assembly irrespective of the kind of the battery assembly.

2. Description of the Related Art

As disclosed in Japanese non-examined laid-open Patent Publication No. 2005-65429, known battery packs with a battery assembly are provided with a memory for storing identification data of the battery pack. When such a battery pack is connected to a battery charger, the battery charger reads the identification data of the battery pack from the memory of the battery pack to judge the kind of the battery assembly from the identification data and charge the battery assembly in a suitable charging way in relation to the kind of the battery assembly.

SUMMARY OF THE INVENTION

It is an object of the present invention to provide an improved technique of suitably charging a battery assembly irrespective of the kind of the battery assembly.

This object is achieved by providing a representative battery charger to charge current to a battery assembly. The battery charger includes a power supply section that supplies charging current to the battery assembly, a detecting section that detects voltage that represents a temperature index of the battery assembly and a reference voltage that is compared with the detected temperature-representing voltage of the battery assembly. The battery charger stops supplying the charging current from the power supply section to the battery assembly to complete charging of the battery assembly when the temperature-representing voltage of the battery assembly reaches or exceeds the reference voltage during the charging operation.

The "battery assembly" may include one or more rechargeable batteries such as lithium ion batteries, nickel-metal hydride batteries and nickel-cadmium batteries. The "temperature-representing voltage" may preferably be defined by a voltage of the thermistor typically disposed near the battery assembly. The "reference voltage" may represent the threshold temperature at which the charge of the battery assembly is to be finished.

According to the representative battery charger, the reference voltage varies according to the charging voltage of the battery assembly. By changing the reference voltage in relation to the charging voltage, the threshold temperature to complete the charge of the battery assembly can be varied according to the charging voltage of the battery assembly. Thus, the threshold temperature for finishing the charge of the battery assembly decreases as the charging operation proceeds and the charging voltage increases so that the charge of the battery assembly can be finished at a relatively low temperature. As a result, an overload state for the battery assembly with high charging voltage and high temperature can effectively be prevented and thus, the battery charger can appropriately charge various kinds of battery assemblies.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide improved battery chargers and method for using such battery chargers and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
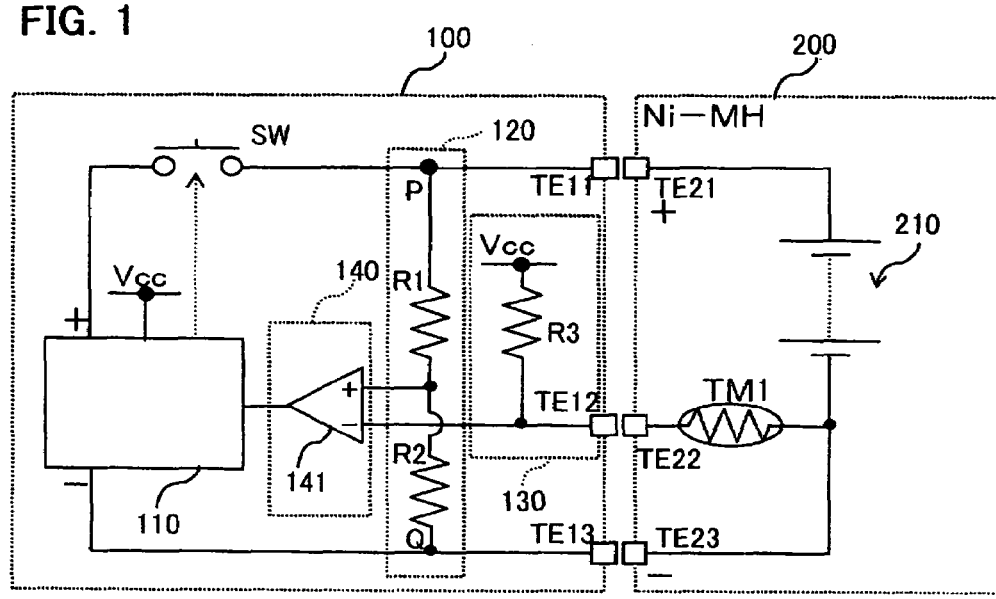
FIG. 1 is a block diagram of a construction for charging a battery pack 200 that includes a battery assembly with nickel-metal hydride batteries, by using a battery charger 100 according to the representative embodiment.
Figure 2:
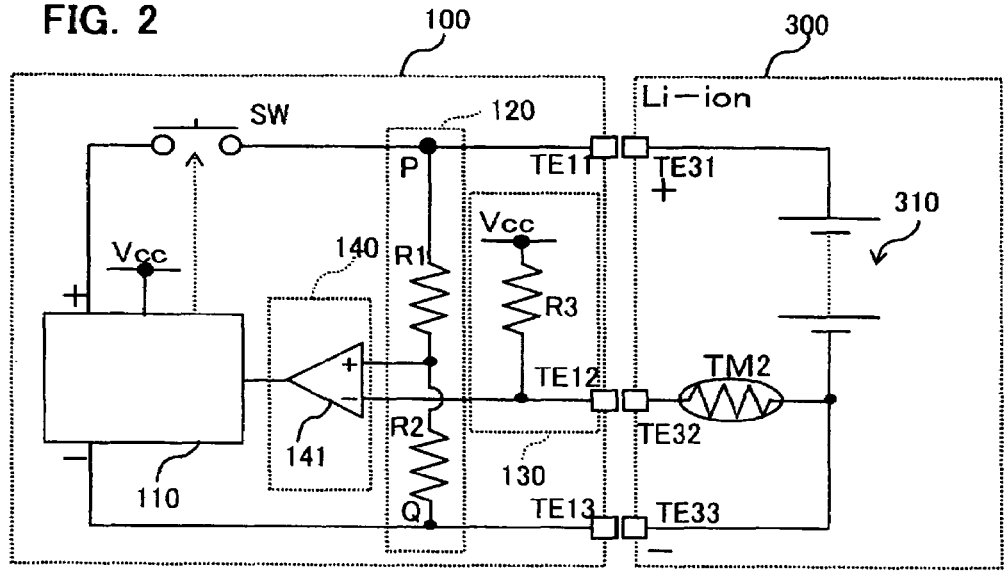
FIG. 2 is a block diagram of a construction for charging a battery pack 300 that includes a battery assembly with lithium ion batteries, by using the battery charger 100.
Figure 3:
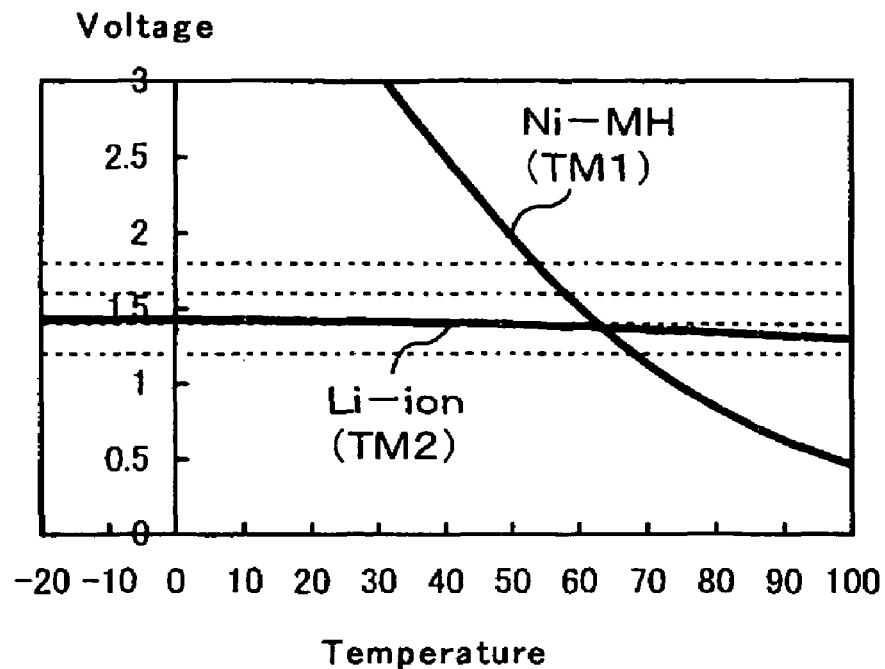
FIG. 3 is a graph showing the thermistor voltage of a thermistor TM1 in the battery pack 200, the thermistor voltage of a thermistor TM2 in the battery pack 300, and the reference voltage that changes as the battery assembly is charged.
Figure 4:
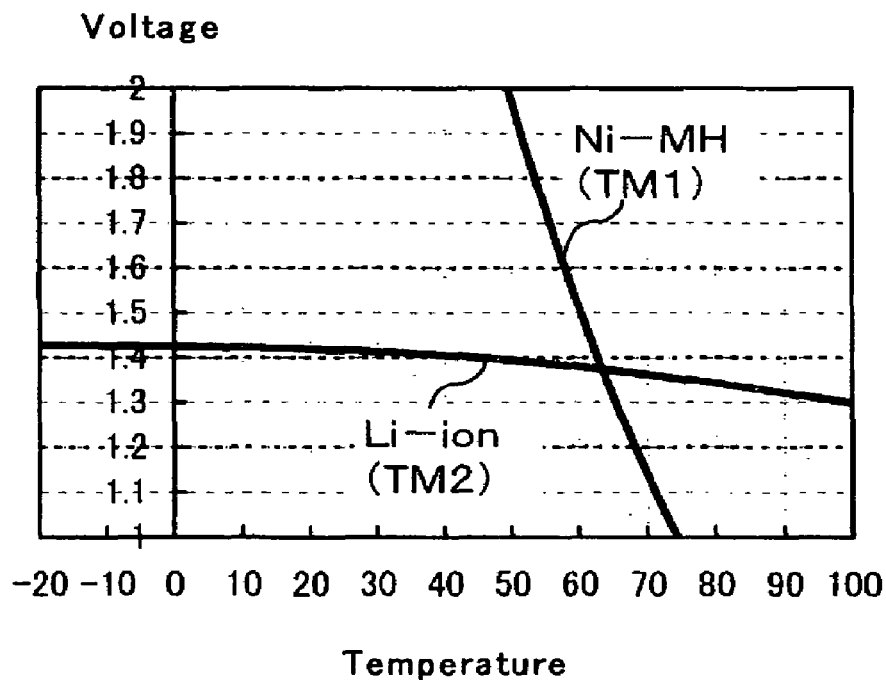
FIG. 4 is a partially enlarged view of FIG. 3.

A representative embodiment of the present invention will now be described with reference to FIGS. 1 to 4. FIG. 1 illustrates the construction for charging a battery pack 200 which includes a battery assembly having nickel-metal hydride batteries, by using a battery charger 100 according to the embodiment. FIG. 2 illustrates the construction for charging a battery pack 300 which includes a battery assembly having lithium ion batteries, by using the battery charger 100. FIG. 3 is a graph showing the thermistor voltage of a thermistor TM1 in the battery pack 200, the thermistor voltage of a thermistor TM2 in the battery pack 300, and the reference voltage which changes as the battery assembly is charged. FIG. 4 is a partially enlarged view of FIG. 3.

First, the construction of the battery charger 100 is explained with reference to FIG. 1. The battery charger 100 includes a power supply controller 110, a charging voltage detecting section 120 that detects the charging voltage of the battery assembly, a thermistor voltage detecting section 130 that detects the thermistor voltage representing the temperature of the battery assembly (which voltage will be described below in more detail), a high-temperature detecting section 140, terminals TE11, TE12, TE13 for connection with the battery pack an input terminal (not shown) for connection with an AC input power, and a switching circuit SW that can be switched to start and stop charging by the power supply controller 110. The power supply controller 110 converts AC input power into DC power, supplies charging current to the battery assembly of the attached battery pack and controls the charging operation. The high-temperature detecting section 140 compares the detected thermistor voltage and the reference voltage based on the charging voltage and outputs a signal when the thermistor voltage is equal to or below the reference voltage.

The input side of the power supply controller 110 is connected to the input terminal which can be connected to the AC input power. The power output terminal on the positive side of the power supply controller 110 is connected to the input side of the switching circuit SW. The output side of the switching circuit SW is connected to the power output terminal TE11. Further, the power output terminal on the negative side of the power supply controller 110 is connected to the power output terminal TE13 which is connected to the battery pack. Thus, when the battery pack is attached to the battery charger 100, a charging circuit is formed in which the battery assembly of the battery pack is charged via the power output terminals TE11, TE13. Further, the power supply controller 110 outputs control power or 5V power Vcc which has been converted from the AC input power. The switching circuit SW is switched on and off by the power supply controller 110.

In the charging voltage detecting section 120, a connection P is connected to the charging circuit that connects the switching circuit SW and the power output terminal TE11. Further, a connection Q is connected to the charging circuit that connects the power supply controller 110 and the terminal TE13. The connection P is connected to one end of a resistor R1, and the other end of the resistor R1 is connected to one end of a resistor R2 and to one input side of a comparator 141 (which will be described below in detail) disposed in the high-temperature detecting section 140. Further, the other end of the resistor R2 is connected to the connection Q. Thus, the voltage (hereinafter referred to as a reference voltage) that is obtained by dividing, by the resistors R1, R2, the voltage between the terminals TE11 and TE13 or the charging voltage of the battery assembly connected to the terminals TE11, TE 13, is inputted to the one input side of the comparator 141.

In the thermistor voltage detecting section 130, one end of a resistor R3 is connected to the terminal TE12. The other end of the resistor R3 is connected to the control power or 5V power Vcc. Further, the terminal TE12 is connected to the other input side of the comparator 141 of the high-temperature detecting section 140. Further, one end of a thermistor is connected to the terminal TE12, and a body of the thermistor is disposed near the battery assembly. Thus, the voltage of the thermistor is inputted to the other input side of the comparator 141.

As mentioned above, the reference voltage is inputted to the one input side of the comparator 141 of the high-temperature detecting section 140, while the thermistor voltage is inputted to the other input side of the comparator 141. Further, the output side of the comparator 141 is connected to the power supply controller 110. With such a construction, the comparator 141 can output a signal to the power supply controller 110 when the thermistor voltage is detected to be equal to or below the reference voltage.

The power supply controller 110 in this embodiment is a feature that corresponds to the "power supply section" in this invention. The thermistor voltage in this embodiment is a feature that corresponds to the "temperature-representing voltage" that represents the temperature index of the battery assembly according to the invention.

Further, referring to FIG. 1, the battery pack 200 includes the battery assembly 210 having a plurality of rechargeable nickel-metal hydride batteries connected in series, terminals TE21, TE22, TE23 to be connected to the battery charger 100 and the thermistor TM1 of which body is disposed near the battery assembly 210. The positive side of the battery assembly 210 is connected to the terminal TE21. The negative side of the battery assembly 210 is connected to the terminal TE23 and one end of the thermistor TM1. The other end of the thermistor TM1 is connected to the terminal TE22. The battery pack 200 and battery assembly 210 are respectively corresponding to the features of "battery pack of a first kind" and "battery assembly of a first kind" in the invention. The thermistor TM1 is a feature that corresponds to the "the temperature-representing voltage output section" in the invention.

Now, referring to FIG. 2, the construction of the battery pack 300 which is charged by the battery charger 100 will be explained in brief. The battery pack 300 includes a battery assembly 310 having a plurality of rechargeable lithium ion batteries connected in series, terminals TE31, TE32, TE33 to be connected to the battery charger 100, and the thermistor TM2 of which body is disposed near the battery assembly 310. The positive side of the battery assembly 310 is connected to the terminal TE31. The negative side of the battery assembly 210 is connected to the terminal TE33 and one end of the thermistor TM2. The other end of the thermistor TM2 is connected to the terminal TE32. The battery pack 300 and battery assembly 310 are respectively corresponding to the features of "battery pack of a second kind" and "battery assembly of a second kind" in the invention. Further, the thermistor TM2 is a feature that corresponds to the "the temperature-representing voltage output section" in the invention.

When any one of the battery packs 200 and 300 is alternatively coupled to the charger 100, the terminals of the battery pack are connected to the associated terminals of the battery charger 100, so that the battery assembly is charged.

Now, the operation of charging the battery pack 200 (or the battery assembly 210 consisting of nickel-metal hydride batteries) by using the battery charger 100 is explained.

First, AC power is connected to AC power input terminals (not shown) of the battery charger 100. Then, the AC input power is converted into the control power or 5V power Vcc in the power supply controller 110 and the control power is supplied to electrical components, such as an IC, in the battery charger 100. Thus, the battery charger 100 starts operating. At this time, the switching circuit SW of the battery charger 100 is placed in the initial state or in the on position. Then, the battery pack 200 is attached to the battery charger 100, and the terminals TE11, TE12, TE13 of the battery charger 100 are connected to the associated terminals TE2, TE22, TE23 of the battery pack 200.

Thus, the charging circuit for charging the battery assembly 210 is formed by connecting the positive side of the power supply terminal of the power supply controller 110, the switching circuit SW, the negative side of the battery assembly 210, the terminal TE23, the power output terminal TE13 of the battery charger 100, and the negative side of the power supply terminal of the power supply controller 110. Then, charging current is supplied from the power supply controller 110 to the battery assembly 210, so that the battery assembly 210 is charged.

The thermistor TM1 of the battery pack 200 includes a negative temperature coefficient (NTC) thermistor having negative temperature characteristics. As a result, as the charging operation proceeds and the temperature of the battery assembly 210 increases, the impedance of the thermistor TM1 decreases so that the thermistor voltage which is detected in the thermistor voltage detecting section 130 decreases. The thermistor voltage of the thermistor TM1 has temperature characteristics as shown in FIG. 3.

Further, in the charging voltage detecting section 120, the voltage between the connections P and Q (the charging voltage of the battery assembly) is detected, and the partial voltage obtained by dividing the voltage by the resistors R1, R2 is outputted as a reference voltage to the high-temperature detecting section 140. The resistances of the resistors R1, R2 may be appropriately selected, but an example will be mentioned below in detail. In any case, as shown by dotted lines in FIGS. 3 and 4, the reference voltage increases as the operation of charging the battery assembly proceeds. Although the reference voltage is shown discontinuously increasing, actually, it continuously increases as the charge of the battery assembly proceeds.

The comparator 141 of the high-temperature detecting section 140 compares the inputted thermistor voltage and the reference voltage and outputs a signal (hereinafter referred to as a "high-temperature detection signal") when the thermistor voltage is equal to or below the reference voltage. When the power supply controller 110 detects the high-temperature detection signal, the power supply controller 110 breaks the charging circuit by placing the switching circuit SW into the off position, so that the charging operation is finished.

As shown in FIG. 4, when the reference voltage is 1.2V (shown by most bottom-sided dotted line in FIG. 4) and the temperature of the battery assembly 210 rises to 68° C., the thermistor voltage is reduced to the reference voltage or below and the charging operation is finished. Further, when the reference voltage rises to 1.4V (shown by second bottom-sided dotted line in FIG. 4) as the charging operation proceeds and the temperature of the battery assembly 210 rises to 63° C., the thermistor voltage decreases to or below the reference voltage and the charging operation is finished. Further, when the reference voltage rises to 1.6V (shown by second upper-sided dotted line in FIG. 4) as the charging operation further proceeds and the temperature of the battery assembly 210 rises to 58° C., the thermistor voltage decreases to or below the reference voltage and the charging operation is finished. Further, when the reference voltage rises to 1.8V (shown by most upper-sided dotted line in FIG. 4) as the charging operation further proceeds and the temperature of the battery assembly 210 falls to 53° C., the thermistor voltage decreases to or below the reference voltage and the charging operation is finished. Therefore, as the charging operation proceeds and the charging voltage of the battery assembly 210 increases, the reference voltage increase and thus the charging operation is caused to be finished at a lower temperature.

Next, the operation of charging the battery pack 300 by using the battery charger 100 is explained. The thermistor voltage of the thermistor TM2 disposed near the lithium ion batteries in the battery pack 300 has temperature characteristics shown in FIGS. 3 and 4. As shown in the drawings, the temperature rise of a lithium ion battery caused by a charge is smaller than that of a nickel-metal hydride battery.

In the same manner as for the battery pack 200, the comparator 141 of the high-temperature detecting section 140 compares the inputted thermistor voltage and the reference voltage and outputs a signal (hereinafter referred to as a "high-temperature detection signal") when the thermistor voltage is equal to or below the reference voltage. When the power supply controller 110 detects the high-temperature detection signal, the power supply controller 110 breaks the charging circuit by placing the switching circuit SW into the off position, so that the charging operation is finished.

As shown in FIG. 4, when the reference voltage is 1.2V (as shown by most bottom-sided dotted line in FIG. 4), the battery assembly 310 with lithium ion batteries continues to be charged. Further, when the reference voltage rises to 1.4V (as shown by second bottom-sided dotted line in FIG. 4) as the charging operation proceeds and the temperature of the battery assembly 310 is not still in the high-temperature range, or about 45° C., the thermistor voltage decreases to or below the reference voltage and the charging operation is finished. Thus, the lithium ion batteries which resist temperature rise during charge rises to the order of 45° C. Therefore, when the reference voltage rises to 1.4V, the operation of charging the battery assembly 310 is finished. Thus, the battery assembly 310 is never charged at the reference voltage exceeding 1.4V.

Thus, the battery charger 100 is designed to stop charging the battery pack 300 when the reference voltage reaches 1.4V. This threshold voltage can be determined by the setting of the resistances of the resistors R1, R2 and selection of the thermistor TM2. Generally, the charging of lithium ion batteries needs to be stopped when they are charged up to 4.2V per cell. For example, if the battery assembly 310 consists of five lithium ion batteries, the charging operation must be stopped when the charging voltage of the battery assembly 310 reaches 21V (21V=5×4.2V). Therefore, the resistances of the resistors R1, R2 are set such that the reference voltage (the voltage which is inputted to the comparator 141) reaches 1.4V when the charging voltage (the voltage between the connections P and Q) reaches 21V. Then, the thermistor TM2 is selected which has temperature change characteristics that, when the charging voltage of the battery assembly 310 is 21V and the temperature of the battery assembly is not yet in the high-temperature range, the thermistor voltage detected in the battery charger 100 reaches 1.4V.

The battery assembly 310 arranged in the battery pack 300 in this embodiment is a feature that corresponds to the "battery assembly of a second kind" in the invention.

The battery charger 100 according to the representative embodiment is configured such that the reference voltage varies according to the charging voltage of the battery assembly 210. Therefore, the threshold temperature to complete the charging of the battery assembly 210 can be varied according to the charging voltage of the battery assembly 210. Therefore, the battery charger 100 can be designed such that the threshold temperature to complete the charging of the battery assembly 210 decreases as the charging of the battery assembly 210 proceeds and the charging voltage increases so that the charging operation can be finished even at a relatively low temperature. The battery charger 100 of this invention can effectively prevent the occurrence of the state which causes an overload on the battery assembly, such as the state in which the charging voltage is high and the temperature of the battery assembly is also high. Thus, the battery charger 100 can appropriately charge various kinds of battery assemblies.

Further, the reference voltage used for determining the time to complete the charging of each of the battery assemblies 210, 310 is proportional to the charging voltage. Thus, like the charging voltage, the reference voltage varies according to the kind of the battery assembly. Here, the charging voltage varies according to the kind of the battery assembly, for example, in the increase rate, the upper limit or the lower limit of the charging voltage. Therefore, in the battery charger 100, when the battery assemblies 210, 310 are charged, the respective reference voltages are set so as to vary according to the kind of the battery. Thus, it is not necessary to judge the kind of the battery assemblies 210, 310, but it is only necessary to judge whether the thermistor voltage has reached the reference voltage. If it is detected that the thermistor voltage has reached the reference voltage, the charging operation may be finished. In this manner, the charging of both of the battery assemblies 210, 310 can be finished at appropriate time. Therefore, the battery charger 100 of this invention does not need a provision of an arrangement for judging the kind of the battery assemblies 210, 310 or an arrangement for switching between the charge control methods in relation to the kind of the battery assemblies.

Further, when charging a battery assembly, such as the battery assembly 310 having lithium ion batteries, of which temperature increase during charge is not relatively large, the reference voltage approaches the voltage of the thermistor TM2 by changing proportionally to the charging voltage. Therefore, the battery charger 100 can be configured such that the voltage of the thermistor TM2 reaches the reference voltage under the influence of the change of the reference voltage or the change of the charging battery. As a result, the battery charger 100 can be adapted to stop charging even if one lithium ion cell is not in the high-temperature state when its voltage reaches 4.2V (the reference voltage of 1.4V in this embodiment shown in FIG. 4) at which charging must be stopped. Further, in the battery charger 100 of this embodiment, when charging a battery assembly, such as the battery assembly 210 having nickel-metal hydride batteries, of which temperature increase during charge is relatively large, the voltage of the thermistor TM1 approaches the reference voltage. Therefore, the battery charger 100 can be configured such that the voltage of the thermistor TM1 reaches the reference voltage under the influence of the change of the voltage of the thermistor TM1, or the change of the voltage of the battery assembly 210. As a result, the battery charger 100 can be adapted to unerringly stop charging when the nickel-metal hydride batteries have reached the high-temperature state.

Further, the battery assembly 310 with lithium ion batteries 310 in the battery pack 300 has temperature change characteristics of the thermistor voltage as shown in FIG. 4. In a typical battery charger for charging a nickel base battery, the reference voltage is fixed, for example, to 1.5V. If the battery pack 300 is attached to such a battery charger, the battery pack 300 will not be charged because the detected voltage of the thermistor TM2 is inherently lower than the reference voltage of 1.5V. Therefore, even if the battery pack 300 having lithium ion batteries 310 is inadvertently attached to a conventional battery charger for nickel base batteries, the battery pack 300 is never charged, so that the battery pack 300 can improve safety.

The present invention is not limited to the constructions described as the representative embodiment, but rather may be added to, changed, replaced with alternatives or otherwise modified. For example, same thermistor TM1 may be used in the both battery packs. In this case, in the battery pack 300, a resistor or other similar element must be appropriately disposed between the battery assembly 310 and the terminal TE32 and adjusted such that the thermistor voltage of the battery pack 300 has temperature change characteristics as shown in FIG. 4. Further, the thermistors TM1, TM2 may comprise PTC thermistors having positive temperature charactristics instead of NTC thermistors. In such case, the circuit (in which the reference voltage is inputted to the comparator 141) for defining the reference voltage based on the charging voltage of the battery assembly is preferably designed such that the reference voltage decreases as the charging voltage increases. Further, the battery charger 100 is capable of charging batteries other than nickel-metal hydride batteries and lithium ion batteries, such as a battery pack having a nickel cadmium battery.

DESCRIPTION OF NUMERALS

100 Battery charger
110 Power supply controller
120 Charging voltage detecting section
130 Thermistor voltage detecting section
140 High-temperature detecting section
141 Comparator
200, 300 Battery pack
210, 310 Battery assembly
P, Q Connection
R1, R2, R3 Resistor
SW Switching circuit
TM1, TM2 Thermistor
Vcc Control power

I claim:

1. A battery charger to charge a battery assembly wherein the battery assembly can be a battery assembly of a first kind and a battery assembly of a second kind, comprising:
a power supply section that supplies charging current to the battery assembly,
a charging voltage detecting section that generates a variable reference voltage, the variable reference voltage being a function of the charging current,
a detecting section that detects a temperature-representing voltage representing a temperature index of the battery assembly, and
a high temperature detecting section that compares the variable reference voltage with the temperature-representing voltage of the battery assembly, the high temperature detecting section in communication with a controller that stops the power supply section from supplying the charging current to the battery assembly so as to finish charging the battery assembly when the temperature-representing voltage of the battery assembly reaches or exceeds the variable reference voltage during a charging operation, the variable reference voltage varying during the charging operation according to the charging voltage of the battery assembly.

2. The battery charger as defined in claim 1 wherein the detecting section comprises a battery pack and temperature-representing voltage output section that outputs the temperature-representing voltage of the battery assembly, wherein the battery assembly and the temperature-representing voltage output section are housed within the battery pack.

3. The battery charger as defined in claim 1, wherein the variable reference voltage for the battery assembly of a first kind comprises a first reference voltage and the variable reference voltage for the battery assembly of a second kind comprises a second reference voltage,
wherein, during the charging operation of the battery assembly of the first kind, the charging voltage of the battery assembly of the first kind varies in relation to the battery assembly of the first kinds the first reference voltage changes proportionally to the charging voltage, and the charging operation is finished when the temperature-representing voltage of the battery assembly of the first kind reaches or exceeds the first reference voltage, and
wherein, during the charging operation of the battery assembly of the second kind, the charging voltage of the battery assembly of the second kind varies in relation to the battery assembly of the second kind in a different manner from the battery assembly of the first kind, the second reference voltage changes proportionally to the charging voltage, and the charging operation is finished when the temperature-representing voltage of the battery assembly of the second kind reaches or exceeds the second reference voltage.

4. The battery charger as defined in claim 3; wherein the charging ratio of the first variable reference voltage in relation to the charging voltage for the battery assembly of the first kind is greater than the second variable reference voltage for the battery assembly of the second kind.

5. The battery charger as defined in claim 3 wherein the battery assembly of the first kind comprises a nickel-metal hydride battery cell or a nickel cadmium battery cell, while the battery assembly of the second kind comprises a lithium ion battery cell.

6. The battery charger as defined in claim 3, wherein the charging operation is finished when the temperature-representing voltage of the battery assembly reaches or exceeds the variable reference voltage, without identifying as to whether the battery assembly that is charged is the first kind or the second kind.

7. The battery charger as defined in claim 3,
wherein the battery charger finishes charging the battery assembly of the first kind based upon judging that the battery assembly reaches a predetermined high-temperature state when the voltage representing the temperature index of the battery assembly reaches the first reference voltage, and
wherein the battery charger finishes charging the battery assembly of the second kind based upon a judge that the battery assembly reaches a state in which the charge is finished, while the battery assembly does not yet reach a predetermined high-temperature state, when the voltage representing the temperature index of the battery assembly reaches the second reference voltage.

8. A battery charging system comprising:
the battery charger as defined in claim 1,
a battery assembly of the first kind that is charged by the battery charger,
a battery pack of the first kind that houses the battery assembly of the first kind,
a temperature-representing voltage output section of the first kind that outputs the temperature index of the battery assembly of the first kind as a first temperature-representing voltage, the temperature-representing voltage output section being housed within the battery pack of the first kind,
a battery assembly of the second kind that is charged by the battery charger,
a battery pack of the second kind that houses the battery assembly of the second kind,
a temperature-representing voltage output section of the second kind that outputs the temperature index of the battery assembly of the second kind as a second temperature-representing voltage, the output section being housed within the battery pack of the second kind,
wherein, during the charging operation of the battery assembly of the first kind, charging voltage for the battery assembly of the first kind varies in relation to the battery assembly of the first kind, a first reference voltage changes proportionally to the charging voltage, and the charging operation is finished when the first temperature-representing voltage reaches or exceeds the first reference voltage, and
wherein, during the charging operation of the battery assembly of the second kind, the charging voltage for the battery assembly of the second kind varies in relation to the battery assembly of the second kind in a different manner from the battery assembly of the first kind, a second reference voltage changes proportionally to the charging voltage, and the charging operation is finished when the second temperature-representing voltage reaches or exceeds the second reference voltage.

* * * * *